United States Patent [19]
Monogioudis et al.

[11] Patent Number: 5,550,810
[45] Date of Patent: Aug. 27, 1996

[54] DIRECT SEQUENCE CODE DIVISION MULTIPLE ACCESS (DS-CDMA) COMMUNICATION SYSTEM AND A RECEIVER FOR USE IN SUCH A SYSTEM

[75] Inventors: Pantelis N. Monogioudis, Athens, Greece; John M. Edmonds, Horley, England

[73] Assignee: U.S. Philips Corporation, New York, N.Y.

[21] Appl. No.: 295,449

[22] Filed: Aug. 24, 1994

[30] Foreign Application Priority Data

Aug. 24, 1993 [GB] United Kingdom .................. 9317604

[51] Int. Cl.$^6$ .................................................. H04J 13/04
[52] U.S. Cl. ............................ 370/18; 375/210; 375/348
[58] Field of Search .............................. 370/18, 32, 32.1; 375/200, 205, 208–210, 233–235, 346, 348; 380/34, 42, 46; 455/296

[56] References Cited

U.S. PATENT DOCUMENTS 4,621,355  11/1986  Hirosaki et al. ...................... 370/18 X
5,341,395   8/1994  Bi ......................................... 370/18 X

OTHER PUBLICATIONS

"Adaptive Cancellation of Nonlinear Intersymbol Interference for Voiceband Data Transmission" E. Biglieri et al, IEEE Journal on Selected Areas in Communications, vol. SAC2, No. 5, Sep. 1984, pp. 765–777.

"Equalization, Detection and Channel Coding for Digital Transmission and Recording Systems" J. W. M. Bergmans, Proc. of Sixth Symposium on Information Theory in the Benelux May 23–24 1985.

"Equalizers for Multiple Input/Multiple Output Channels and Pam Systems with Cyclostationary Input Sequences" A. Duel–Hallen, IEEE Journal on Selected Areas in Communications, vol. 10, No. 3, Apr. 1992, pp. 630–639.

"Very Low Rate Convolutional Codes for Maximum Theoretical Performance of Spread Spectrum Multiple Access Channels" A. Viterbi, IEEE Journal on Selected Areas in Communications, vol. 8, No. 4, May 1990, pp. 641–649.

Primary Examiner—Melvin Marcelo
Attorney, Agent, or Firm—David Schreiber; Eugene Rosenthal

[57] ABSTRACT

A DS-CDMA system comprises at least one transmitter and at least one receiver operating on a dedicated signal channel which is used by other DS-CDMA operators in a non-synchronous way. A receiver for use in such a DS-CDMA system includes a data aided multiuser interference canceller (38) comprising a feedforward filter (48) connected to a subtracting stage (50). A decision stage (52) is connected to an output of the subtracting stage (50). Decisions from the decision stage (52) are stored in a memory which also stores preliminary decisions made on the signal applied to the feedforward filter (48) by a simple receiver (46). These decisions are applied to a feedback filter (58) the output of which is connected to the subtracting stage (50) thereby removing the effects of pre-cursive and post-cursive interference. The input to, and output from, the decision stage 52 are compared and the difference is used for adjusting the tap weights of the feedforward and feedback filters (48,58). In the case of a single input, single output, the feedforward filter (48) comprises a fractionally spaced equalizer which despreads and filters the DS-CDMA signal. In the case of multiple input, multiple output, the received signal is despread in a bank of code matched filters and the output is applied to the canceller (38) in which the feedforward filter (48) comprises a linear synchronous equalizer.

22 Claims, 4 Drawing Sheets

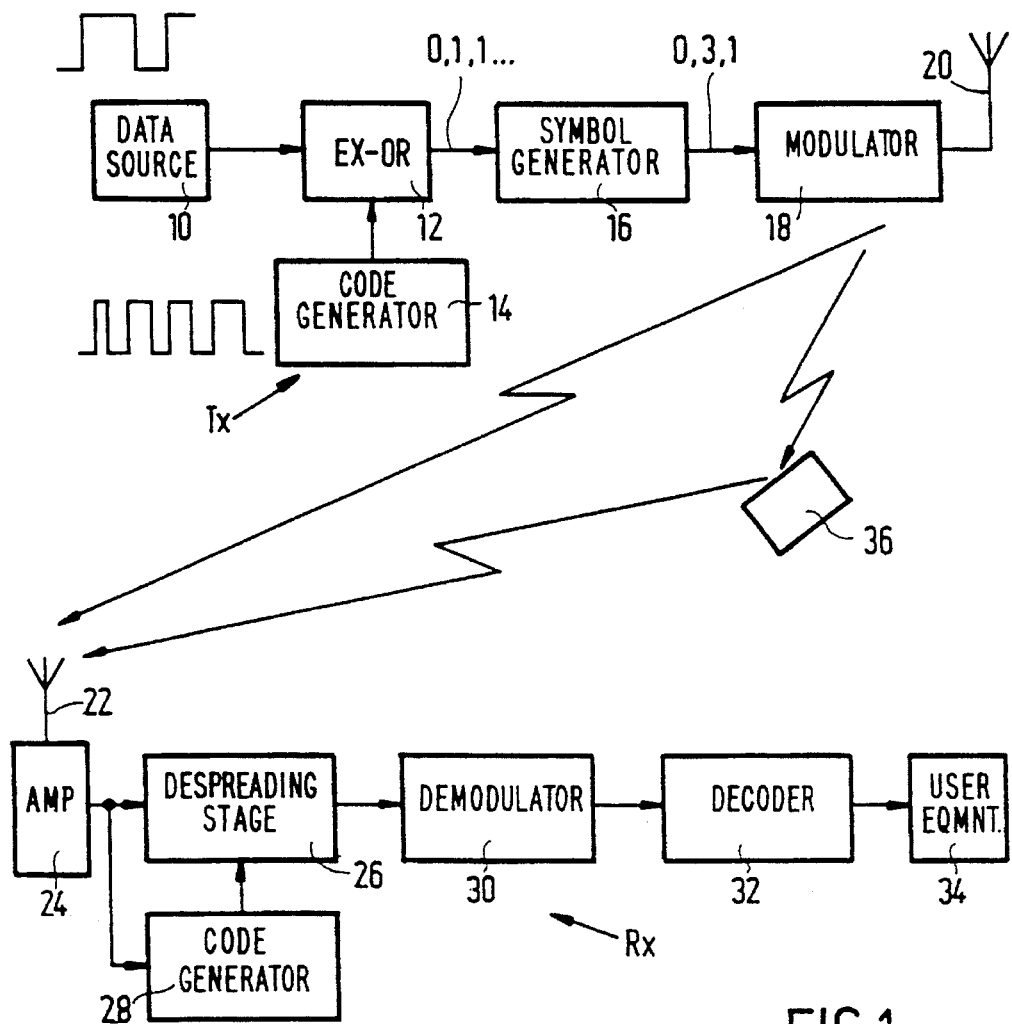
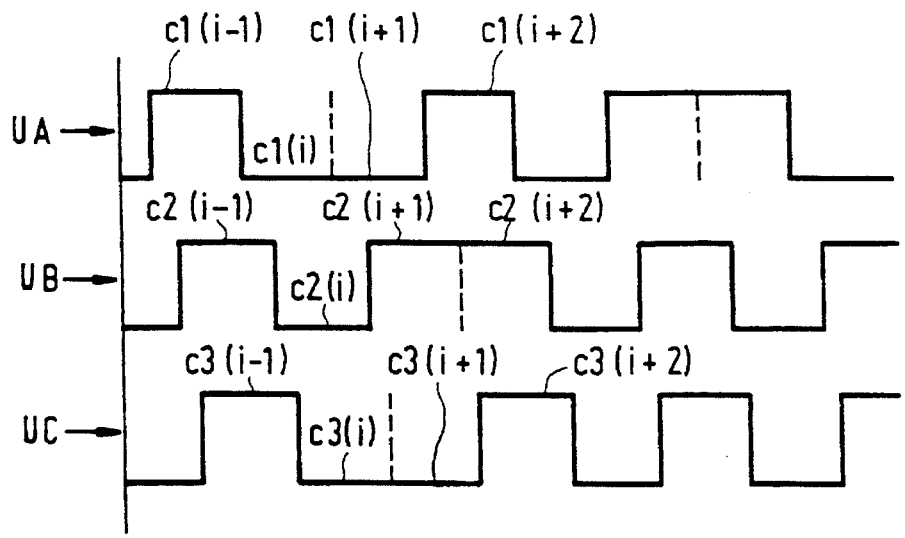
FIG.1
PRIOR ART
FIG.2

DIRECT SEQUENCE CODE DIVISION MULTIPLE ACCESS (DS-CDMA) COMMUNICATION SYSTEM AND A RECEIVER FOR USE IN SUCH A SYSTEM

BACKGROUND OF THE INVENTION

The present invention relates to a direct sequence code division multiple access (DS-CDMA) communication system and to a receiver for use in such a system.

In a DS-CDMA communication system a digital signal, for example digitised speech or data, is multiplied by a coding sequence comprising a pseudo-random sequence which spreads the energy in the modulating signal, which energy is transmitted as a spread spectrum signal. At the receiver, the antenna signal is multiplied by the same pseudo-random sequence which is synchronised to the spreading sequence in order to recover the modulating signal. Due to multipath effects which will cause intersymbol interference, Rake combining is used to overcome these effects and to produce a modulating signal which can be demodulated satisfactory.

In the case of a DS-CDMA communication system several different spread spectrum signals having the same or different chip rams and transmitted simultaneously at the same frequency by different users may be received at an antenna, each signal having been subject to different multipath effects, a method of equalisation which attempts to determine the channel impulse response and invert it is not adequate. Amongst the problems is what is known as the near-far effect due to signals from transmitters being received at a base station at different power levels. This effect is overcome by the base stations having fast power control algorithms.

In order for a receiver to be able to adapt itself to different conditions which may be found in practice, it must be able to cope with multiple bit rates which are required by a multi-media service provision, variations in the loading of the system, bit error degradation that other users' interference causes and power control failure caused, for example, by near-far interference under severe fading conditions.

SUMMARY OF THE INVENTION

It is an object of the present invention to recover a DS-CDMA signal effectively.

According to one aspect of the present invention there is provided a direct sequence-code division multiple access (DS-CDMA) system comprising a transmitter and a receiver, the transmitter having means for multiplying a modulating signal with a spreading sequence in order to form a spread spectrum signal and for transmitting the spread spectrum signal on a CDMA channel, and the receiver comprising means for receiving signals on said CDMA channel, means for cancelling multiple access interference, said means including feedforward filtering means, feedback filtering means, quantizing means for producing quantized decisions from information derived from the feedforward filtering means, means for making tentative decisions on received information, means for producing an inversion of the equivalent CDMA channel in dependence on the cross correlation values of all the contemporaneous users and means responsive to the production of the inversion of the equivalent CDMA channel for adjusting tap weights of at least the feedforward filtering means.

According to a second aspect of the present invention there is provided a direct sequence-code division multiple access (DS-CDMA) system comprising a transmitter and a receiver, the transmitter having means for multiplying a modulating signal with a spreading sequence in order to form a spread spectrum signal and for transmitting the spread spectrum signal on a CDMA channel, and the receiver comprising an interference canceller having a signal input, delay means coupled to the input, an equalizer having an input coupled to the delay means, first subtracting means having first and second inputs and an output, the first input being connected to an output of the equalizer, a quantizing stage having an input coupled to the output of the subtractor and a signal output, second subtracting means having a first input coupled to the input of the quantizing stage and a second input coupled to the output of the quantizing stage and an output, means for producing preliminary decisions having an input coupled to the signal input and an output, memory means having first input means coupled to the output of the quantizing stage, second input means coupled to the output of the means for producing preliminary decisions and output means, signal cancelling means having first input means coupled to the output means of the memory means, and an output coupled to the first subtracting means, wherein the output of the second subtracting means is coupled to means for adjusting the tap weights of the equalizer and the signal cancelling means and wherein the length of the equalizer is substantially equal to or greater than the length of a spreading sequence used to form the DS-CDMA signal.

According to a third aspect of the present invention there is provided a receiver for a DS-CDMA signal, comprising means for cancelling multiple access interference, said means including feedforward filtering means, feedback filtering means, quantizing means for producing quantized decisions from information derived from the feedforward filtering means, means for making tentative decisions on received information, means for producing an inversion of the equivalent CDMA channel in dependence on the cross correlation values of all the contemporaneous users and means responsive to the production of the inversion for adjusting tap weights of at least the feedforward filtering means.

According to a fourth aspect of the present invention there is provided a receiver for a DS-CDMA signal, comprising an interference canceller having a signal input, delay means coupled to the input, an equalizer having an input coupled to the delay means, first subtracting means having first and second inputs and an output, the first input being connected to an output of the equalizer, a quantizing stage having an input coupled to the output of the subtractor and a signal output, second subtracting means having a first input coupled to the input of the quantizing stage and a second input coupled to the output of the quantizing stage and an output, means for producing preliminary decisions having an input coupled the signal input and an output, memory means having first input means coupled to the output of the quantizing stage, second input means coupled to the output of the means for producing preliminary decisions and output means, signal cancelling means having first input means coupled to the output means of the memory means, and an output coupled to the first subtracting means, wherein the output of the second subtracting means is coupled to means for adjusting the tap weights of the equalizer and the signal cancelling means and wherein the length of the equalizer is substantially equal to or greater than the length of a spreading sequence used to form the DS-CDMA signal.

It is known from IEEE Journal on Selected Areas in Communications, Vol. SAC-2, No. 5, September 1984, pages 765 to 777 "Adaptive Cancellation of Nonlinear Intersymbol Interference for Voiceband and Data Transmission" E. Biglieri et al, to use preliminary or "tentative" decisions for removing intersymbol interference, due to channel nonlinearities, for voiceband data transmission. FIG. 4 on page 768 of this article illustrates a baseband nonlinear canceller in which an input signal is applied to a linear equalizer whose output is divided into two paths. One of the two paths includes a delay device coupled to one input of a summing stage which functions as a subtractor. The other of the two paths includes means for making tentative decisions on the output of the linear equalizer and using these to adjust the tap weights of the linear equalizer. An output of the tentative decision means is supplied to means for storing the tentative decisions for use in a feedforward section of a non-linear canceller whose output is coupled to a second input of the summing stage. An output of the summing stage is coupled to a final decision stage which has an output for coupling the final decisions back to storage means for use in a feedback section of the non-linear canceller. This known arrangement is intended as means for attachment to the linear equalizer.

J. W. M. Bergmans in the Proceedings "Sixth Symposium on Information Theory in the Benelux" 23–24 May 1985, Mierlo, pages 161 to 169 "Equalization, Detection and Channel Coding for Digital Transmission and Recording Systems" discloses in FIG. 3, page 165, a canceller for intersymbol interference. The canceller comprises a decision feedback circuit having a receiving filter with an input for the channel signal, means for sampling the output of the receiving filter at the bit rate, a summing stage having an input coupled to receive the sampled signal and an output coupled to a bit-by-bit detector which produces the final decisions. The final decisions are applied to a feedback filter for removing post cursive intersymbol interference, the output of which is applied to another, inverting, input of the summing stage. Pre-cursive intersymbol interference is removed by connecting a simple receiver for producing tentative decisions to the input of the receiving filter. The tentative decisions are applied to a feedforward filter which has an output connected to a further, inverting, input of the summing stage. Such known arrangements endeavour to produce the inverse of the channel impulse response which is used to cancel the interference. A problem with DS-CDMA is that there may be several different simultaneous transmissions on the same frequency channel, which transmissions may be asynchronous and at different bit rates. Accordingly in order to approach the performance of a single user it is not sufficient just to estimate the channel impulse response and perform combining.

IEEE Journal on Selected Areas in Communications Vol. 10, No. 3, April 1992, pages 630 to 639 "Equalizers for Multiple Input/Multiple Output Channels and PAM Systems with Cyclostationary Input Sequences" by Alexandra Duel-Hallen considers minimum mean square error (MMSE) linear and decision feedback (DF) equalizers for multiple input/multiple output (MIMO) communication systems with intersymbol interference and wide sense stationary inputs. The consideration is done by working in the D-transform domain and concludes, amongst other things, that decision feedback methods were significantly better than linear equalizers. For dealing with multi-user interference in DS-CDMA transmissions, decision feedback equalizers are not good enough because they do not obtain, and make use of, tentative decisions obtained independently from the received transmissions.

BRIEF DESCRIPTION OF THE DRAWINGS

The present invention will now be explained and described, by way of example, with reference to the accompanying drawings, wherein:

FIG. 1 is a block schematic diagram of a DS-CDMA communication system comprising a transmitter and receiver, FIG. 2 illustrates asynchronous bit streams of three active users.

In the drawings, the same reference numerals have been used to indicate corresponding features.

DETAILED DESCRIPTION OF THE PREFERRED EMBODIMENTS

Figure 3:
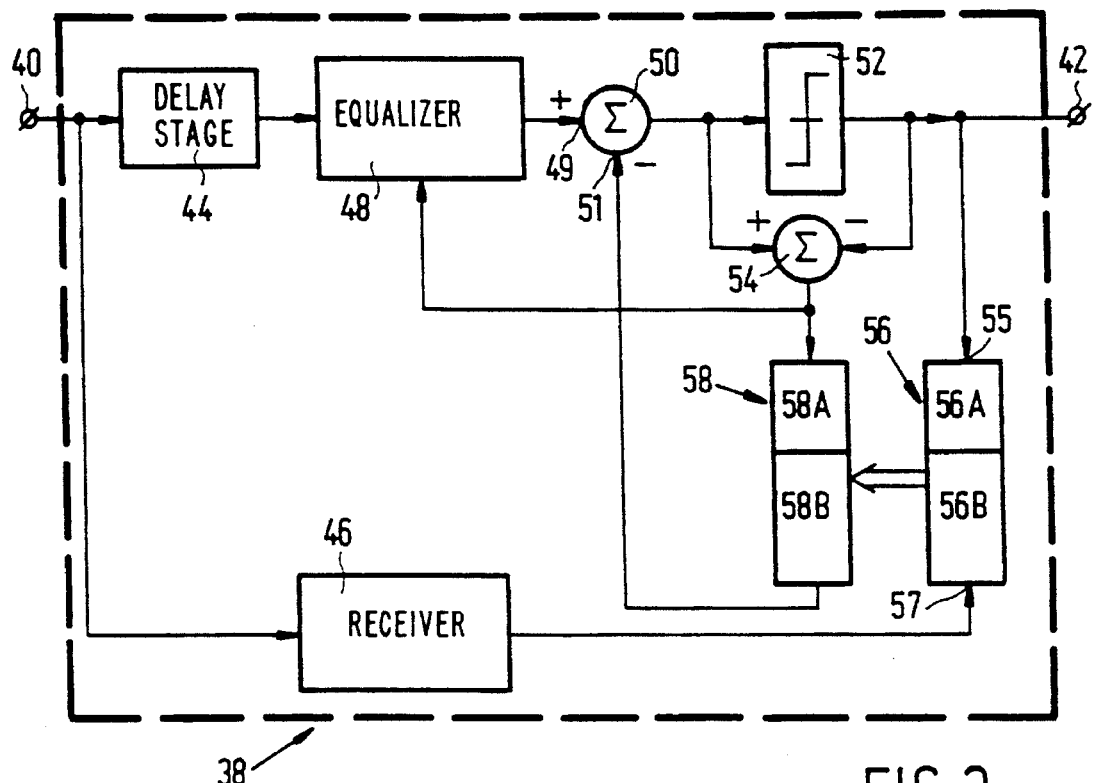
FIG. 3 is a block schematic diagram of one embodiment of a data-aided multiuser interference canceller.

FIG. 1 of the drawings illustrates a typical transmitter/receiver arrangement used in a DS-CDMA communication system.

The transmitter Tx comprises a source 10 of digital data which may comprise a data terminal or a speech coder. The output from the source 10 comprises a stream of bits having a frequency F bits per second. The stream of bits is applied to a digital multiplier such as an EX-OR gate 12. A pseudo-random code generator 14 generates a coding sequence expressed in chips per bit, for example N chips per bit, which is applied to the EX-OR gate 12. The output of the EX-OR gate 12 comprises a stream of chips having a frequency FxN chips per second. Thus for example if F=10db/s and N=1000 then the chip rate is 10M chips/second. The output from the EX-OR gate 12 is applied to a symbol generator 16 which in turn is coupled to a digital modulator (or mapper) 18 and finally to an antenna 20. As is known, one effect of spreading the spectrum of digital data from the source 10 is to spread the energy in the signal over a wider bandwidth so that it appears as noise when viewed on an oscilloscope.

The receiver Rx comprises an antenna 22 connected to an rf amplifying stage 24. The received signal is then passed to a despreading stage 26 which is supplied with the same coding sequence from a code generator 28. In an over simplified version of the receiver, the stage 26 would comprise an EX-OR stage whose output would be a signal at the bit rate. However in reality the stages 26,28 have to synchronise the locally generated code sequence with that in the signal, frequently by means of correlation, and also deal with multiple path intersymbol interference due to portions of the transmitted signal being reflected by obstructions such as a tall building 36 shown diagrammatically in FIG. 1. Additionally as it is envisaged that there will be other differently coded users using the same frequency channel there is the problem of reducing and/or eliminating the effects of interference due to the other users whose codes may have different rates, termed multiuser multirate interference cancellation, then additional stages are required to cope with these problems. The bit rate signal from the stage 26 is applied to a demodulator 30, then to a decoder 32 after which the recovered signal is applied to a user equipment 34 such as a data terminal or speech decoder.

FIG. 2 illustrates asynchronous bit streams of three active users UA, UB and UC and serves to illustrate the multiuser intersymbol interference (ISI) problem. From FIG. 2 it can be deduced that each chip interferes with K-1 previous chips and K-1 future chips, where K is the number of contemporaneous users, in this example K=3. Taking user UB as a reference, symbol c2(i) interferes with c1(i) and c3(i−1), that is the past symbols, arriving before c2(i), and with c1(i+1) and c3(i), that is future symbols, arriving after c2(i). It is the partial overlap of symbols that creates the multiuser ISI problem. In general from a receiver point of view, the superposition of K spread spectrum signals can be thought of as multiuser ISI, caused by the partial overlap of the chips from different users. Conventionally multiuser equalization is used to cancel ISI since it can be shown that the simultaneous demodulation of all active users in a multiple access channel can be regarded as a problem of periodically (or time) varying ISI.

A receiver made in accordance with the present invention comprises a data aided multiuser interference canceller. One example of such a canceller 38 is shown in FIG. 3. The canceller 38 comprises an input 40 and output 42. The signal applied to the input 40 may have already been despread using for example a bank of code matched filters (not shown), the outputs of which are combined in a summing stage. As the received signal has been despread the signal at the terminal 40 is the data signal in bits. Alternatively the signal may not already have been despread in which case the data signal is in chips. In any event the signal at the output 42 comprises bits.

Assuming an embodiment in which the signal at the input comprises bits, a delay stage 44 and a simple receiver 46 are connected to the input 40. A linear synchronous equalizer 48 has an input connected to the delay stage 44 and an output coupled to an input 49 of a subtracting stage 50. A maximum likelihood decision stage 52 is coupled between an output of the subtracting stage 50 and the output 42 for deriving quantized decisions from the soft decision information presented at the output of the subtracting stage. Another subtracting stage 54 obtains the difference between the signals applied to, and derived from, the decision stage 52. A memory 56 formed by two first in first out (FIFO) sections 56A, 56B has inputs 55, 57 coupled to the output 42 and to the output of the receiver 46, respectively, for storing the quantized decisions and tentative (or preliminary) decisions derived respectively therefrom. A transversal filter 58 has an input coupled to the memory 56 and an output coupled to an input 51 of the subtracting stage 50. The output from the subtracting stage 54 comprises an error signal which is applied to the lineariser 48 and to the transversal filter 58 in order to recalculate the filter tap weights in accordance with for example a least mean square (LMS) algorithm or a recursive least squares (RLS) algorithm, known per se.

The operation of the canceller 38 can more readily be understood by treating stages 48, 50, 52 and 58 as a decision feedback equalizer in which a feedforward section (the equalizer 48) processes the currently received bit signals and a feedback section (the decision stage 52 and the transversal filter 58) removes partly the ISI caused by the past decisions on the symbols from the equalizer 48 by subtraction from the output of the equalizer 48.

In FIG. 3 any residual ISI and noise at the output of the equalizer 48 is further reduced by what is termed multivariate prediction. It is multivariate because what is being fed back are past decisions from all the random processes involved in the cancellation.

The simple receiver 46 comprises a separate equalizer which makes preliminary decisions about future samples and when used in combination with decisions about past samples will provide a good representation of the precursor and post cursor ISI and very good cancellation of the ISI in the current sample at the output of the equalizer 48. These future and past decisions are stored in the memory 56 and are applied to the input of the transversal filter 58 consisting of parts 58A, 58B. The part 58B has a greater number of stages for the future decisions than the part 58A for the past decisions.

The amount of delay introduced by the stage 44 compensates for the transmission of the signal through the simple receiver 46. Means (not shown) are provided for clocking the various stages of the canceller 38 in synchronism.

Figure 4:
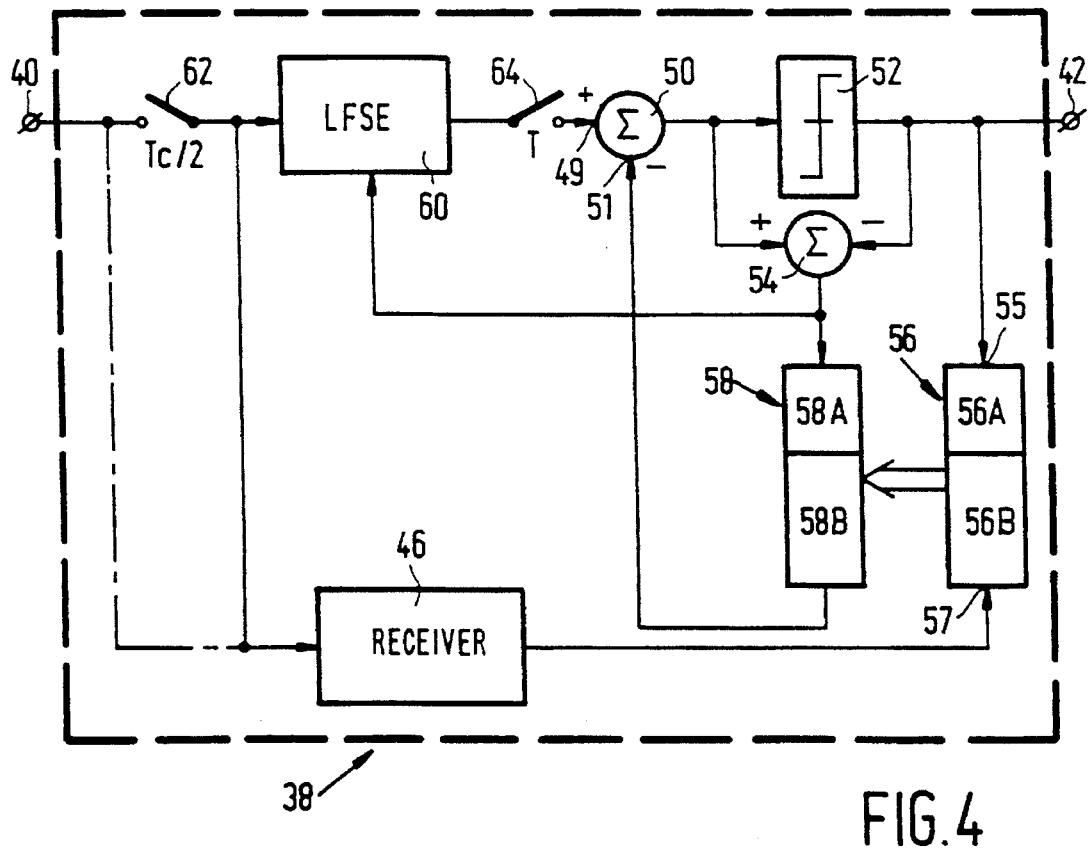
FIG. 4 is a block schematic diagram of a second embodiment of a data-aided multiuser interference canceller having a fractionally spaced equalizer.

In a single input single output variant of the embodiment shown in FIG. 3 the linear synchronous equalizer 48 is replaced by a linear fractionally spaced equalizer 60 (FIG. 4). The equalizer 60 itself is a transverse equalizer into which chips are clocked by a sampling device 62 operating at a multiple of the chip frequency for example twice the chip frequency. However the output of this equalizer is sampled by a sampling device 64 at the bit rate. In this embodiment, the simple receiver 46 is replaced by either a fractionally spaced equalizer having an input coupled to the output of the sampling device or the combination of a code matched filter and an equalizer. In either case the output comprises a bit rate signal. The data aided multiuser interference canceller otherwise operates as described with reference to FIG. 3. The error signal from the subtracting stage 54 is used to calculate the tap weights of the equalizer 60 and the transversal filter 58.

In the case of the embodiments shown in FIGS. 3 and 4, the lengths of the equalizer 48 in the feedforward path is greater than or comparable to the length of the spreading sequence. If the length is not correct, the receiver's resistance to the near/far effect is affected.

An equation for the updating of the tap weights is $$\underline{c}_{n+1} = \underline{c}_n + 2\mu.\epsilon.\underline{v}_n$$

where $\underline{c}_{n+1}$ and $\underline{c}_n$ are vectors representing the new and previous tap weights, $\underline{v}_n$ is a vector representing an input to the equalizer, $\epsilon$ is the error signal (from the subtracting stage 54), and $\mu$ is a constant which is critical when considering the near-far effect.

In the case of the linear fractionally spaced equalizer 60, the constant $\mu$ has a value of $10^{-6}$.

Figure 5:
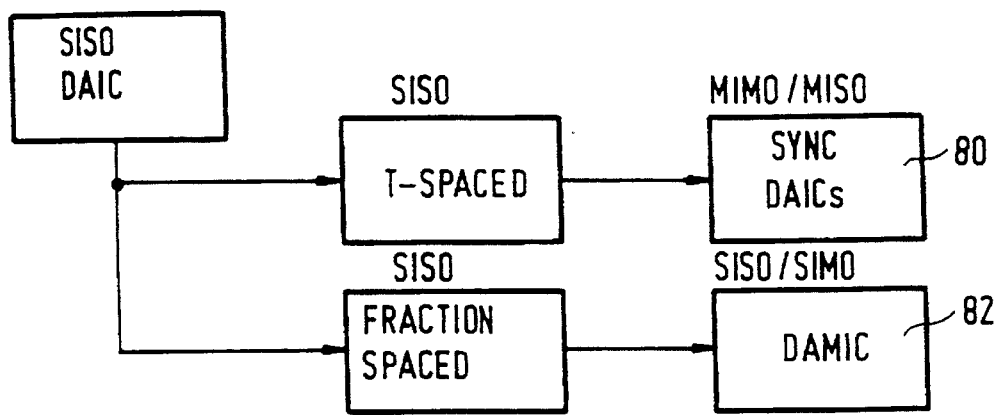
FIG. 5 is a block diagram of alternative data aided interference cancellers made in accordance with the present invention.

FIG. 5 illustrates diagrammatically two approaches to cancelling multiple access interference in DS-CDMA transmissions using multivariate predication.

A first approach concerns single input, single output (SISO) for a bit rate signal. The CDMA intersymbol interference canceller comprises either a multiple input multiple output (MIMO) arrangement, which would be used by a base station to recover signals from several users, or multiple input/single output (MISO) arrangement, which would be used by a base station to recover a signal for one user, consisting of a bank 80 of synchronised data aided interference cancellers (DAICs). In the case of MIMO architecture, the data aided multiuser interference canceller can exploit the additional information coming from the code matched filters of the interfering users. The simple receiver 46 will then provide preliminary decisions of the future interfering symbols. These preliminary decisions do not necessarily have to be correct.

An alternative approach relating to using SISO for a chip rate signal, comprises a SISO or single input multiple output SIMO arrangement comprising a single data aided multiuser interference canceller (DAMIC) 82 of a type described with reference to FIGS. 3 and 4. In the case of SISO, the DAMIC observes the accumulated ISI from the simultaneous mobile station transmissions and attempts to remove it. In the SISO implementation architecture the simple receiver 46 produces preliminary decisions of future data symbols (data of the user of interest). This does not necessarily mean that the future decisions have to be correct. Thus, the complexity requirements for the receiver 46 can be relaxed provided that the effect of incorrect tentative decisions to the overall receiver performance is not very significant.

Figure 6:
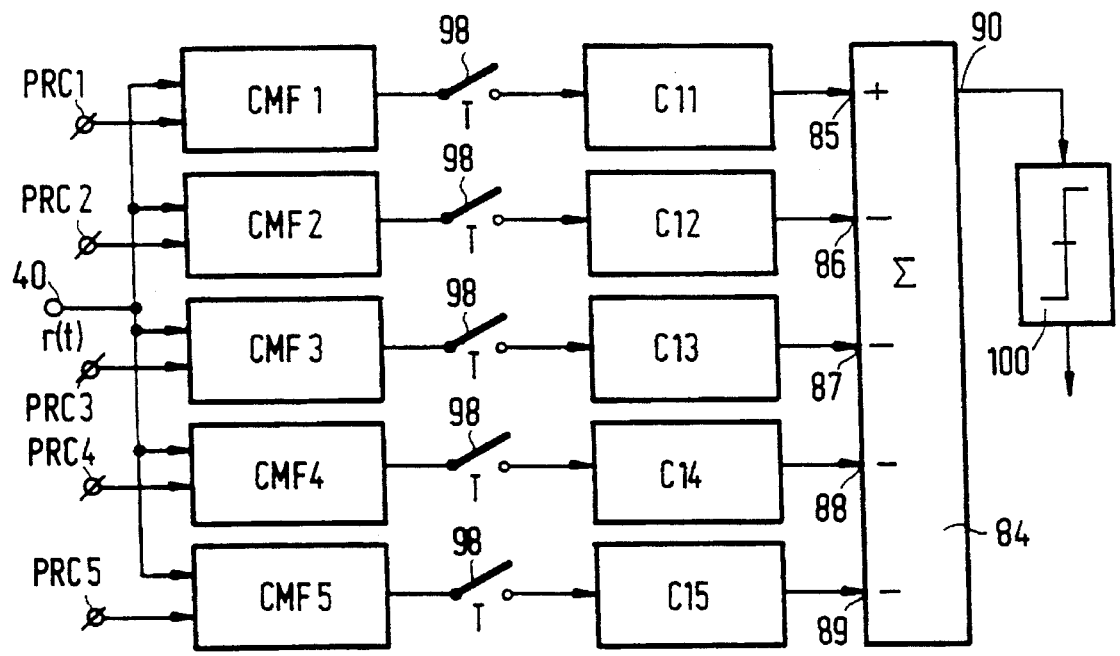
FIG. 6 is a block schematic diagram of a multiple input, single output (MISO) linear synchronous equalizer.

FIG. 6 illustrates a block schematic diagram of a MISO arrangement. A received signal r(t) on the input 40 is applied to a bank of code matched filters CMF1 to CMF5 each of which has an input for a respective user's code PRC1 to PRC5 in order to despread the signal. Each code matched filter, which comprises a correlator and an integrator, or, alternatively, an FIR filter has an output coupled by respective bit rate sampling devices 98 to respective data aided multiuser interference cancellers C11 to C15. A summing stage 84 has inputs 85 to 89 coupled to outputs from the respective cancellers C11 to C15 and an output 90 connected to a decision stage 100.

Assuming that the wanted user has the code PRC1, the signals on the inputs 86 to 89 are subtracted from that on the input 85.

A k×k MIMO data aided multiuser interference canceller, where k is the number of users, can be described by a matrix C(D) which denotes its transfer function in the frequency (D-transform) or time domain, as follows:-

$$C(D) = \begin{pmatrix} C_{11}(D) & C_{12}(D) & \ldots & C_{1k}(D) \\ C_{21}(D) & C_{22}(D) & \ldots & C_{2k}(D) \\ \cdot & \cdot & & \cdot \\ \cdot & \cdot & & \cdot \\ \cdot & \cdot & & \cdot \\ C_{k1}(D) & C_{k2}(D) & \ldots & C_{kk}(D) \end{pmatrix}$$

Any one row of this matrix describes a MISO detector which is equivalent to a SISO fractionally spaced (FS) data aided multiuser interference canceller. The matrix C(D) is derived by using the Minimum Mean Square criterion, known per se. In the case of FIG. 6, the output of the decision stage (or quantizer) 100 minus the bits transmitted by the user of interest, squared has to be minimised.

An extension of the receiver to cancel interference by other users that transmit with different bit rates will now be described. In order to achieve this capability, a form of coding which has multirate capability is best employed, one such coding is a low rate orthogonal convolution (LOROC) code disclosed in IEEE Journal on Selected Areas in Communications, Vol. 8, No. 4, May 1990, pages 641 to 649, "Very Low Rate Convolutional Codes for Maximum Theoretical Performance of Spread-Spectrum Multiple-Access Channels" by Andrew J. Viterbi.

At the transmitter, data at the bit rate is applied to a shift register comprising K stages, which are clocked at the bit rate. After each updating of the shift register, a row of symbols from a $2^k \times 2^k$ Hadamard matrix is selected in accordance with the number in the shift register and is read out and each symbol of the row is multiplied by each chip of the spreading code.

Figure 7:
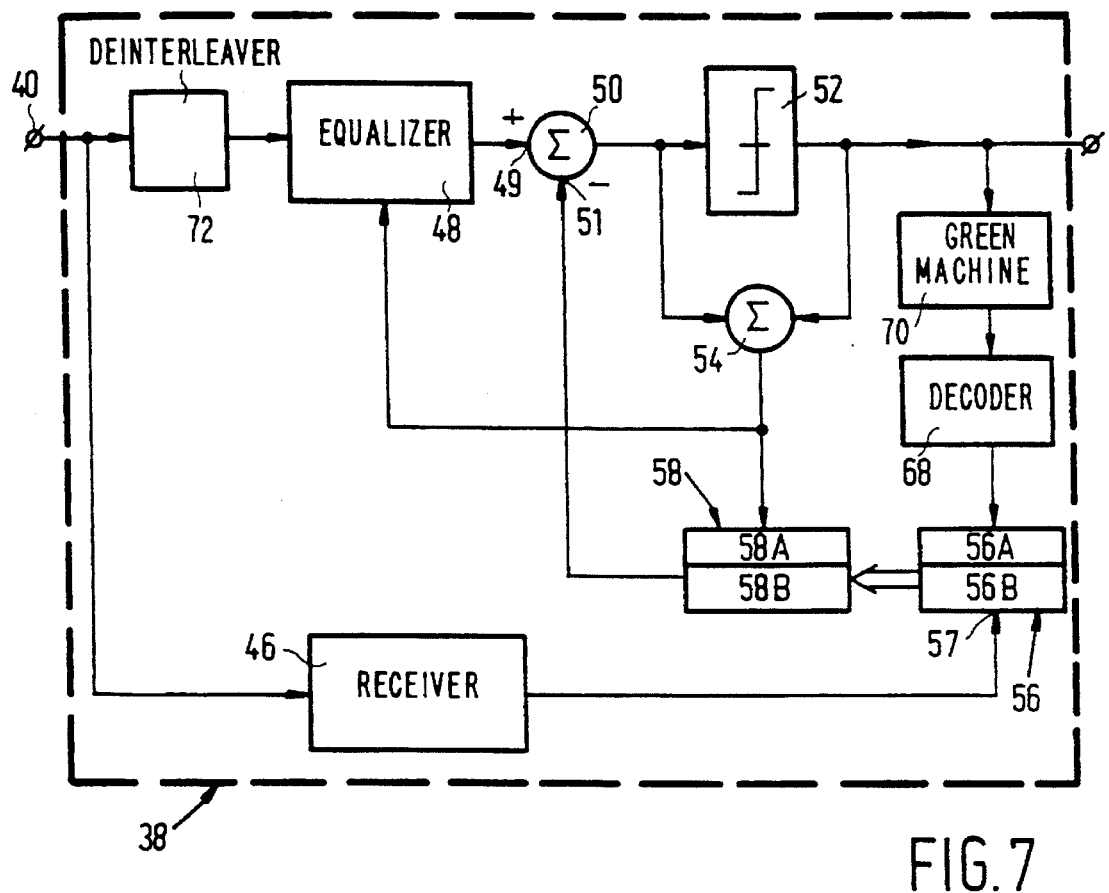
FIG. 7 is a block schematic diagram of an embodiment of a data aided multiuser multirate interference canceller.

FIG. 7 illustrates a data aided multiuser multibit interference canceller suitable for use with block interleaved LOROC encoded signals having a constant chip rate, that is the product of bit rate x spreading factor is constant. Thus if the bit rate is reduced then the spreading factor is increased and vice versa. In the interests of brevity only the features of difference between FIGS. 3 and 7 will be described. In FIG. 7, a deinterleaver 72 is used in place of the delay stage 44 and the output of the decision stage 52 is coupled a Green Machine 70 whose output is coupled to a Viterbi decoder 68 which provides decisions which are stored in the memory 56. The Green Machine 70 which is mentioned in the above article by Viterbi computes the correlation values of a code with all rows of the Hadamard matrix. The number of the row which has the largest correlation value is fed to the Viterbi decoder 68 which operates as a maximum likelihood decoder.

The reliability of the decisions from the Viterbi decoder 68 is greater than when error protection coding is not used with the result that the canceller shown in FIG. 7 has more effective performance.

Figure 8:
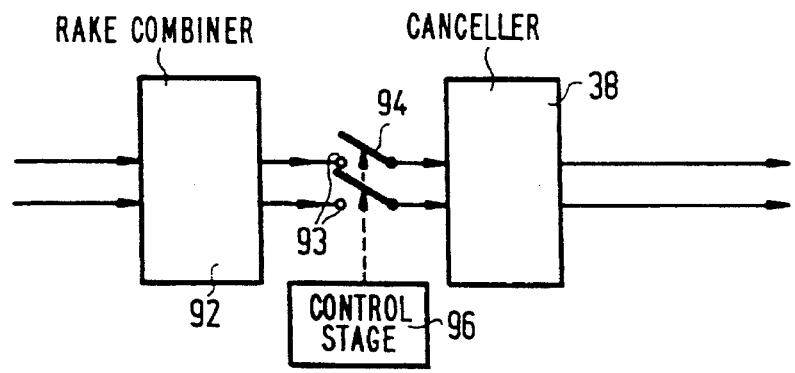
FIG. 8 is a block schematic diagram of a dual mode receiver architecture.

The interference cancellers illustrated in FIGS. 3 to 7 can be optionally added to a known DS-CDMA system that has a voice dedicated channel. FIG. 8 shows a Rake combiner 92 whose outputs 93 are connectable to the canceller 38 by switches 94 which are controlled by a control stage 96 which actuates the switches 94 in response to the result of an interference cancellation control algorithm.

The Rake combiner 92, known per se, comprises a bank of code matched filters each having an input for a dynamically delayed version of the pseudo random code of any one particular user, delay means and a signal combiner. Although the Rake receiver can be used to combine optimally the multipath components, it is more effective in cancelling other users' interference and hence reducing the bit error rate (BER).

If a receiver is in a good reception area and the power control algorithm normally used to compensate for the near-far effect is able to provide adequate performance, the switches 94 are open and battery power is saved through not having to operate the canceller 38. When the receiver Rx hands over to a saturated cell or when the power control algorithm cannot operate correctly, the switches 94 are closed to connect the canceller 38 to the Rake combiner and provide multiuser cancellation. This effectively increases the capacity of the system, since the quality of the channel may be otherwise intolerable.

From reading the present disclosure, other modifications will be apparent to persons skilled in the art. Such modifications may involve other features which are already known in the design, manufacture and use of DS-CDMA systems and receivers therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A direct sequence-code division multiple access (DS-CDMA) system, having associated therewith cross correlation values among contemporaneous users, the system comprising: a transmitter and a receiver, the transmitter having means for multiplying a modulating signal with a spreading sequence in order to form a spread spectrum signal and means for transmitting the spread spectrum signal on a CDMA channel, and the receiver comprising receiving means for receiving signals on said CDMA channel, and interference cancelling means for cancelling multiple access interference, said interference cancelling means including an input coupled to the receiving means for receiving the received signals, feedforward filtering means coupled to the input for processing the received signals, quantizing means coupled to the feedforward filtering means for producing quantized decisions from information derived from the feedforward filtering means, tentative decision means coupled to the input for making tentative decisions on the received signals, characterizing means, coupled to the tentative decision means and the quantizing means, for characterizing the CDMA channel in dependence on the cross correlation values of all the contemporaneous users, and adjusting means responsive to the characterizing means for adjusting tap weights of at least the feedforward filtering means so as to cancel substantially multiple access interference.

2. The system as claimed in claim 1, wherein the CDMA channel is described in the frequency or time domain by a matrix C(D), where $$C(D) = \begin{matrix} C_{11}(D) & C_{12}(D) & \ldots & C_{1k}(D) \\ C_{21}(D) & C_{22}(D) & \ldots & C_{2k}(D) \\ \cdot & \cdot & \cdot \cdot \cdot & \cdot \\ \cdot & \cdot & \cdot \cdot \cdot & \cdot \\ \cdot & \cdot & \cdot \cdot \cdot & \cdot \\ C_{k1}(D) & C_{k2}(D) & \ldots & C_{kk}(D) \end{matrix}$$

and where k represents a number of users.

3. The system of claim 2, wherein the characterizing means, in characterizing the CDMA channel produces an inversion of the characterized channel.

4. The system of claim 2, wherein the CDMA channel is described in the frequency domain using the D-transform.

5. The system as claimed in claim 1, wherein the characterizing means comprises a feedback filtering means coupled to each of the tentative decision means and the quantizing means for processing the tentative decisions and the quantized decisions.

6. The system as claimed in claim 5, wherein the characterizing means comprises memory means, coupled to each of the tentative decision means and the quantizing means, for storing tentative decisions and quantized decisions, respectively.

7. The system as claimed in claim 6, wherein the feedback filtering means is coupled to the tentative decision means via the memory means, and is coupled to the feedforward filtering means at least via the quantizing means.

8. The DS-CDMA system as claimed in claim 7, wherein the feedback filtering means is coupled to the feedforward filtering means via first differencing means, the first differencing means having a first input that receives a signal output by the feedforward filtering means, a second input that receives a signal output from the feedback filtering means, and an output that comprises a first difference signal, the first difference signal is derived from the difference between the signals received at the first and second inputs and is provided to a second differencing means as a first input thereof and to the quantizing means, the second differencing means receives as a second input the quantized decisions of the quantizing means and produces a second difference signal that is provided to at least one of the feedback filtering means and the feedforward filtering means.

9. The system as claimed in claim 1, wherein the characterizing means comprises memory means, coupled to each of the tentative decision means and the quantizing means, for storing tentative decisions and quantized decisions, respectively.

10. The system as claimed in claim 1, wherein the interference cancellation means includes an output to which the quantizing means is coupled for transmission of the quantized decisions.

11. A direct sequence-code division multiple access (DS-CDMA) system comprising a transmitter and a receiver, the transmitter having means for multiplying a modulating signal with a spreading sequence in order to form a spread spectrum signal and for transmitting the spread spectrum signal on a CDMA channel, and the receiver comprising an interference canceller having a signal input, delay means coupled to the input, an equalizer having an input coupled to the delay means, first subtracting means having first and second inputs and an output, the first input being connected to an output of the equalizer, a quantizing stage having an input coupled to the output of the subtractor and a signal output, second subtracting means having a first input coupled to the input of the quantizing stage and a second input coupled to the output of the quantizing stage and an output, means for producing preliminary decisions having an input coupled to the signal input and an output, memory means having first input means coupled to the output of the quantizing stage, second input means coupled to the output of the means for producing preliminary decisions and output means, signal cancelling means having first input means coupled to the output means of the memory means, and an output coupled to the first subtracting means, wherein the output of the second subtracting means is coupled to means for adjusting the tap weights of the equalizer and the signal cancelling means and wherein the length of the equalizer is substantially equal to or greater than the length of a spreading sequence used to form the DS-CDMA signal.

12. A receiver for receiving direct sequence-code division multiple access (DS-CDMA) signals on a CDMA channel, the signals being transmitted by contemporaneous users and having associated therewith cross correlation values, the receiver comprising: means for cancelling multiple access interference, said means including feedforward filtering means, feedback filtering means, quantizing means for producing quantized decisions from information derived from the feedforward filtering means, means for making tentative decisions on the received DS-CDMA signal, characterizing means, coupled to the tentative decision means and the quantizing means, for characterizing the CDMA channel in dependence on the cross correlation values of all the contemporaneous users, and adjusting means responsive to the characterizing means for adjusting tap weights of at least the feedforward filtering means so as to cancel substantially multiple access interference.

13. A receiver for a DS-CDMA signal, comprising an interference canceller having a signal input, delay means coupled to the input, an equalizer having an input coupled to the delay means, first subtracting means having first and second inputs and an output, the first input being connected to an output of the equalizer, a quantizing stage having an input coupled to the output of the subtractor and a signal output, second subtracting means having a first input coupled to the input of the quantizing stage and a second input coupled to the output of the quantizing stage and an output, means for producing preliminary decisions having an input coupled to the signal input and an output, memory means having first input means coupled to the output of the quantizing stage, second input means coupled to the output of the means for producing preliminary decisions and outputs means, signal cancelling means having first input means coupled to the output means of the memory means, and an output coupled to the first subtracting means, wherein the output of the second subtracting means is coupled to means for adjusting the tap weights of the equalizer and the signal cancelling means and wherein the length of the equalizer is substantially equal to or greater than the length of a spreading sequence used to form the DS-CDMA signal.

14. A receiver as claimed in claim 13, wherein the signal cancelling means has a plurality of shift register stages for receiving preliminary decisions derived in operation and stored in the memory means and past decisions derived in operation and stored in the memory means, characterised in that the number of shift register stages required for past decisions is less than the number of shift register stages required for preliminary decisions.

15. A receiver as claimed in claim 14, characterized in that the equalizer comprises a fractionally spaced equalizer which despreads and equalizes a received DS-CDMA signal.

16. A receiver as claimed in claim 14, characterized in that the equalizer comprises a linear synchronous equalizer and in that a signal despreading means is coupled to said signal input.

17. A receiver as claimed in claim 14, characterized by the interference canceller having decoding means coupled between the signal output of the quantizing stage and the first input to the memory means.

18. A receiver as claimed in claim 14, wherein for a multiple input single output, the receiver is characterized by a plurality of code matched filters having a common input for receiving an input signal, means for applying a different user's spreading code to each of the code matched filters, means for sampling the output of each code matched filter at the bit rate, a corresponding plurality of interference cancellers having inputs coupled to a respective one of the sampling means, means coupled to outputs of the interference cancellers for subtracting unwanted signals from a wanted signal and producing a difference signal and quantizing means having an input for receiving the difference signal.

19. A receiver as claimed in claim 13, characterised in that the equalizer comprises a fractionally spaced equalizer which despreads and equalizes a received DS-CDMA signal.

20. A receiver as claimed in claim 13, characterised in that the equalizer comprises a linear synchronous equalizer and in that a signal despreading means is coupled to said signal input.

21. A receiver as claimed in claim 13, characterised by the interference canceller having decoding means coupled between the signal output of the quantizing stage and the first input to the memory means.

22. A receiver as claimed in claim 13, wherein for a multiple input single output, the receiver is characterised by a plurality of code matched filters having a common input for receiving an input signal, means for applying a different user's spreading code to each of the code matched filters, means for sampling the output of each code matched filter at the bit rate, a corresponding plurality of interference cancellers having inputs coupled to a respective one of the sampling means, means coupled to outputs of the interference cancellers for subtracting unwanted signals from a wanted signal and producing a difference signal and quantizing means having an input for receiving the difference signal.

\* \* \* \* \*